(No Model.) 2 Sheets—Sheet 1.

W. M. MUELLER & O. F. BURFORD.
STALK CUTTER.

No. 504,934. Patented Sept. 12, 1893.

WITNESSES:
Chas. Nida
C. Sedgwick

INVENTORS
W. M. Mueller
BY O. F. Burford
Munn & Co
ATTORNEYS.

(No Model.) 2 Sheets—Sheet 2.

W. M. MUELLER & O. F. BURFORD.
STALK CUTTER.

No. 504,934. Patented Sept. 12, 1893.

WITNESSES:
Chas. Nidd.
C. Sedgwick.

INVENTORS
W. M. Mueller
O. F. Burford
BY Munn & Co
ATTORNEYS.

UNITED STATES PATENT OFFICE.

WILLIAM M. MUELLER AND OSKAR FRANK BURFORD, OF ELMWOOD, NEBRASKA.

STALK-CUTTER.

SPECIFICATION forming part of Letters Patent No. 504,934, dated September 12, 1893.

Application filed July 2, 1892. Serial No. 438,754. (No model.)

*To all whom it may concern:*

Be it known that we, WILLIAM M. MUELLER and OSKAR FRANK BURFORD, of Elmwood, in the county of Cass and State of Nebraska, have invented a new and useful Improvement in Stalk-Cutters, of which the following is a full, clear, and exact description.

Our invention relates to an improvement in stalk cutters, and has for its object to provide an implement which is simple, durable and economic and through the medium of which stalks, when harvested upon the field, may be expeditiously and conveniently cut in lengths enabling them to be plowed under, and whereby also the stalks will be straightened out and held in their straigthened position in advance of and for the action of the cutter.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
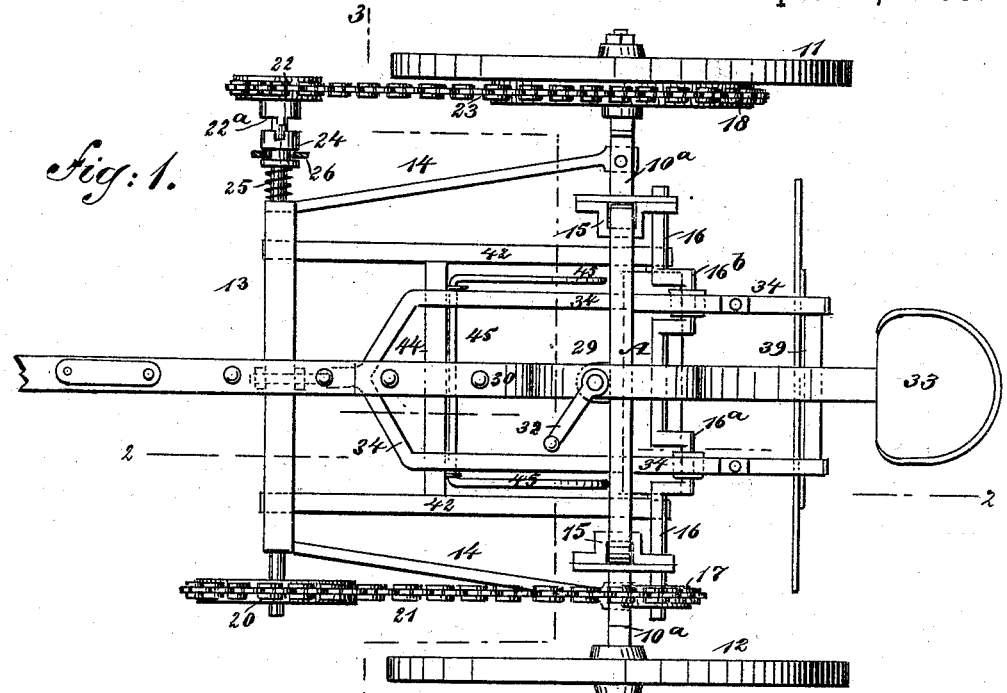
Figure 2:
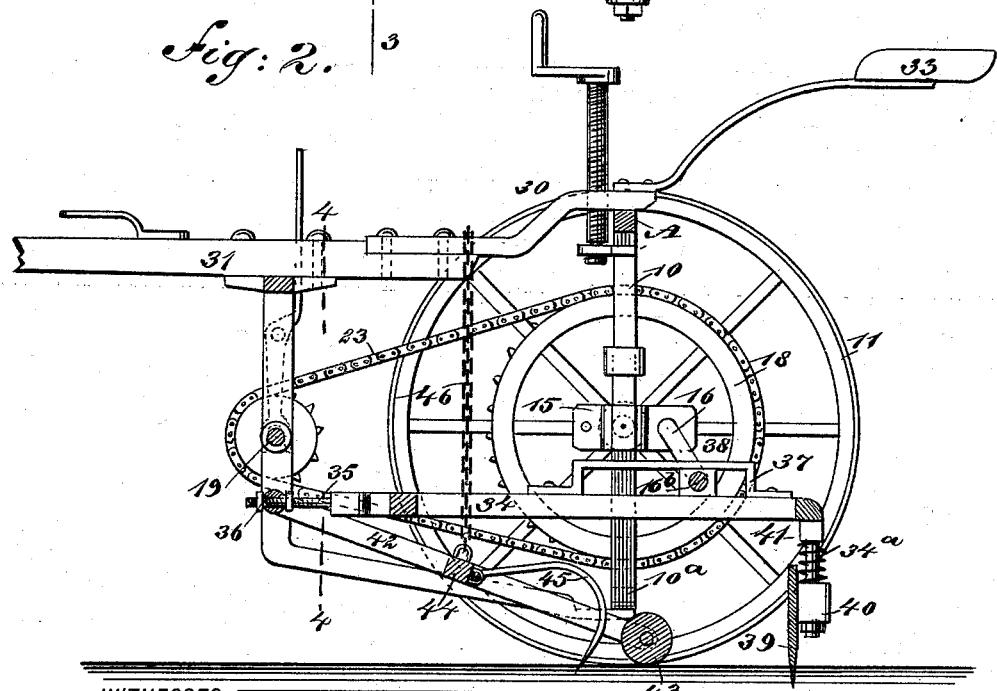
Figure 3:
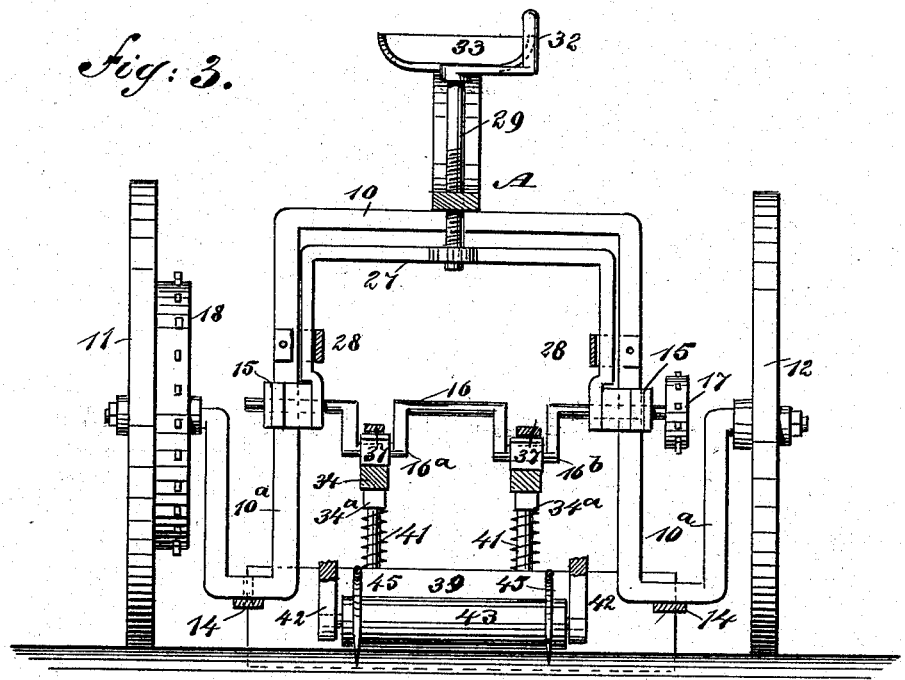
Figure 4:
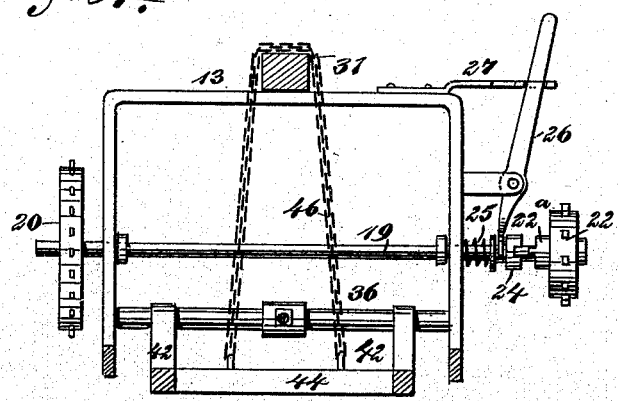

Figure 1 is a plan view of the implement. Fig. 2 is a longitudinal vertical section, taken practically on the line 2—2 of Fig. 1. Fig. 3 is a transverse vertical section taken essentially on the line 3—3 of Fig. 1; and Fig. 4 is a sectional view through the tongue, a portion of the cutter frame and the straightening frame, the section being taken essentially on the line 4—4 of Fig. 2.

The axle A, is what is known as a yoke axle, and the members of the U or arch body 10 of the axle are carried outward or sidewise horizontally in opposite directions, and then vertically upward forming a stirrup section $10^a$, at each side of the body of the axle; the outer members of the stirrup sections of the axle are carried horizontally outward, and upon them the supporting wheels 11 and 12, are loosely mounted.

At the forward portion of the machine a yoke or arch frame 13, is vertically located, the horizontal portion of the frame being uppermost; and each member of the frame at its lower end is continued rearward and inclined somewhat in direction of the rear, and the lower ends of these extensions, which may be properly termed extension arms and are designated as 14, are attached to the stirrup sections of the axle, whereby the axle is made the support for the frame.

Upon the vertical members of the yoke or arch section 10 the axle boxes 15 of any approved construction are held to slide; and in the rear extensions of these boxes a crank shaft 16, is journaled at its extremities. The crank shaft between the arched section of the axle is provided with two crank arms $16^a$ and $16^b$, and at one end the crank shaft has secured thereto a sprocket wheel 17.

At the side of the machine opposite that at which the sprocket wheel 17, is located, a larger sprocket wheel 18, is attached to the drive wheel 11, which is the right-hand wheel, the sprocket wheel on the crank shaft being at the left-hand side of the machine.

In the frame 13, between its upper and lower portion, a drive shaft 19, is journaled, and this drive shaft is provided at its left-hand end with a large sprocket wheel 20, rigidly secured thereto and connected by a chain belt 21 with the smaller wheel upon the crank shaft.

At the right-hand end of the drive shaft 19 a sprocket wheel 22, is also secured, but smaller in diameter than the wheel at the opposite end of this shaft; and this sprocket wheel 22, is connected by a chain belt 23, with a spur wheel 18, carried by the supporting wheel 11, of the machine. By this means, as the machine is drawn over the ground, motion is communicated to the drive shaft and from it to the crank shaft. Preferably the gear 22 upon the drive shaft is loosely mounted thereon, and the inner surface of its hub is provided with a clutch face $22^a$, and this clutch face is adapted for engagement with a clutch 24, which is splined upon and is capable of sliding on the drive shaft 19. A spring 25, coiled around the shaft has a tendency to normally cause the clutch to engage with the clutch face of the sprocket wheel 22; and the clutch is further partially surrounded by a shifting lever 26, of any approved construction, which shifting lever at its outer end is to be engaged with a rack 27, projected outward ordinarily from the upper portion of the front frame 13, as is best shown in Fig. 4. Thus the drive shaft may be thrown out of gear with the driving sprocket wheel 18 whenever it is deemed advisable.

The boxes 15 in which the crank shaft 16, is journaled are connected by a frame 27ª and this frame has movement in the arch or yoke section of the axle, as shown in Fig. 3, it being guided in its movement by straps 28, or their equivalent, attached to the axle; and this frame is raised or lowered, and consequently the boxes 15 and crank shaft 16, preferably through the medium of an adjusting screw 29. This screw is held to turn in a threaded aperture produced in an extension 30 of the inner end of the pole 31, the said extension being secured to the upper central portion of the axle. The upper end of the adjusting screw is ordinarily provided with an attached crank 32, and its lower end is swiveled in the box-carrying frame 27ª. The adjusting screw is convenient to the driver's seat 33, as said seat is fastened upon the extension 30 of the pole back of the screw, as shown in Fig. 2.

The chopping mechanism is constructed and located as follows: Said mechanism consists of a somewhat skeleton frame 34, and the body of this frame is horizontally located within the yoke section of the axle, while the rear end of the frame is carried downward in the shape of two posts 24ª, the posts being preferably vertically located. The forward end of the frame 34 has integral therewith or attached thereto a rod 35, and this rod is secured at its forward end, as shown in Fig. 2, in any suitable or approved manner to the central portion of a spindle 36, which spindle is journaled in the vertical members of the forward frame 13. Each of the members of the body of the frame 34, is provided upon its upper face with a bracket 37, and these brackets act in conjunction with the body of the frame as slide-ways for boxes 38, as shown in Fig. 2, and through these boxes the crank arms 16ª and 16ᵇ of the crank shaft pass, so that when the crank shaft rotates the rearward post extensions of the frame will give a vertically-reciprocating movement, the forward portion of the frame rocking with the spindle 36. The rear post extensions of the frame carry the knife 39, and this knife is located transversely of the frame, and upon its outer face is provided with sockets 40, through which the posts 34ª of the frame pass, the lower ends of the posts beneath the sockets being provided with lock nuts or their equivalents; and a shoulder is produced upon the posts adjacent to the body of the frame; and around the posts between the sockets of the knife and the shoulders of the posts, springs 41, are located, so that the knife is provided with a spring cushion.

In addition to the cutter frame 34, what may be termed a straightening frame 42, is also employed. This frame is also of skeleton shape and more or less rectangular in general contour. The forward end of the frame is loosely mounted upon the spindle 36, and its rear end carries a roller 43, adapted when the machine is in operation to travel upon the surface of the ground or over the stalks to be cut; and the frame is likewise provided with a cross bar 44, located at or near its central portion; and upon this cross bar hooks 45, are pivoted at their forward ends, the rear portions of the hooks being adapted to travel upon the ground in advance of the roller. The straightening frame 42, has a chain 46, attached to it, which passes upward over the pole 31; and by lengthening or shortening this chain the roller teeth of the lower frame may be elevated from the ground or made to travel upon it. Thus in the operation of the machine, when the crank shaft is geared with the combined driving and supporting wheel 11, the hooks straighten out the stalks and the roller following the hooks holds them in their straightened position and prevents them from flying about as the knife, which is vertically reciprocated, passes through the stalks and cuts them into lengths, the length in which the stalks are cut being regulated by the length of stroke of the cutting frame 34.

Having thus described our invention, we claim as new and desire to secure by Letters Patent—

1. The combination with the frame having an arched axle 10, of the vertically adjustable connected boxes on the vertical arms of the axle, means for raising and lowering the boxes, a crank shaft journaled in said boxes, vertically vibrating bars pivotally connected at their forward ends with the frame and having guide ways, blocks on the cranks and sliding in said guides, and the chopping knife carried by the rear ends of the said bars, substantially as set forth.

2. The combination with the frame having the arched axle 10, 10ª, of the boxes 15 sliding on the vertical members of the axle, the yoke carrying said boxes at its lower ends, the vertical screw mounted in the frame and swiveled at its lower end to the said yoke, and the vertically vibrating chopping bars pivotally connected at their forward ends with the frame and having guide ways between their ends for the cranks of said crank shaft, substantially as set forth.

3. The combination with the wheeled frame, of the longitudinally extending bars 34 pivoted at their forward ends to swing vertically and provided at their rear ends with depending posts 34ª, of the transverse knife set vertically edgewise and having eyes 40 sliding on said posts, springs on the posts above said eyes, and mechanism for operating the bars 34, substantially as set forth.

4. A stalk chopper, comprising the arched axle 10, 10ª, the arch frame 13, having extension arms 14 secured at their rear ends to the lower ends of the arched axle, the tongue 31 secured to top of frame 13 and also connected with top of the axle by a rearward extension 30, spindle 36 journaled at its ends in frame 13, the roller frame secured to said spindle, teeth mounted on the roller frame in front of the roller, and the vibrating frame 34 secured to the spindle 36 and provided at its rear end with a chopping knife, and means for raising and lowering the frame 34, substantially as set forth.

WILLIAM M. MUELLER.
O. FRANK BURFORD.

Witnesses:
BELLE STOPHER,
W. S. WATERS.